(12) United States Patent
Park et al.

(10) Patent No.: US 9,407,360 B2
(45) Date of Patent: Aug. 2, 2016

(54) OPTICAL LINE MONITORING SYSTEM AND METHOD

(71) Applicant: LS Cable Ltd., Anyang-si, Gyeonggi-do (KR)

(72) Inventors: Ji-Sang Park, Seoul (KR); Lae-Hyuk Park, Seoul (KR); Ki-Yeul Kim, Seoul (KR); Kwan-Hee Han, Suwon-si (KR); Eun-Jeong Yang, Seoul (KR)

(73) Assignee: LS CABLE LTD., Anyang-si, Gyeonggi-do (KR)

( * ) Notice: Subject to any disclaimer, the term of this patent is extended or adjusted under 35 U.S.C. 154(b) by 191 days.

(21) Appl. No.: 14/350,589

(22) PCT Filed: Oct. 10, 2012

(86) PCT No.: PCT/KR2012/008216
§ 371 (c)(1),
(2) Date: Apr. 9, 2014

(87) PCT Pub. No.: WO2013/055105
PCT Pub. Date: Apr. 18, 2013

(65) Prior Publication Data
US 2014/0308033 A1    Oct. 16, 2014

(30) Foreign Application Priority Data

Oct. 11, 2011    (KR) .................. 10-2011-0103744
Feb. 17, 2012    (KR) .................. 10-2012-0016530

(51) Int. Cl.
*H04B 10/08*    (2006.01)
*H04B 10/07*    (2013.01)
*H04B 10/071*    (2013.01)

(52) U.S. Cl.
CPC .............. *H04B 10/07* (2013.01); *H04B 10/071* (2013.01)

(58) Field of Classification Search
CPC .......................... H04B 10/07; H04B 10/071
USPC ..................... 398/25, 33, 21, 20, 13
See application file for complete search history.

(56) References Cited

U.S. PATENT DOCUMENTS 6,512,610 B1    1/2003    Minami et al.
7,738,787 B2 *  6/2010    Nakajima ......... G01M 11/3145
                                                  398/158

(Continued)

FOREIGN PATENT DOCUMENTS

CN    101360984 A    2/2009
CN    102055523 A    5/2011

(Continued)

OTHER PUBLICATIONS

International Search Report for PCT/KR2012/008216 mailed Dec. 26, 2012 from Korean Intellectual Property Office.

*Primary Examiner* — M. R. Sedighian
(74) *Attorney, Agent, or Firm* — Paratus Law Group, PLLC

(57) ABSTRACT

Disclosed is an optical line monitoring system and method which detects an optical line where a disorder occurs, by using an OTDR (Optical Time Domain Reflectometer) pulse pattern with matching information. The optical line monitoring system generates and stores a reference OTDR pulse pattern matched with identification information of an optical channel service unit, and compares the matched reference OTDR pulse pattern with the OTDR pulse pattern collected at an inspection time to verify an optical line region where a disorder occurs.

10 Claims, 4 Drawing Sheets

(56) References Cited

U.S. PATENT DOCUMENTS

| | | | |
|---|---|---|---|
| 8,145,057 B2 * | 3/2012 | Costa | H04L 12/2898 398/151 |
| 8,270,828 B2 * | 9/2012 | Nakajima | H04B 10/071 398/13 |
| 8,406,620 B2 * | 3/2013 | Khermosh | H04B 10/071 398/13 |
| 8,655,167 B1 * | 2/2014 | Lam | H04B 10/071 398/16 |
| 2009/0190921 A1 | 7/2009 | Nakajima et al. | |
| 2010/0166419 A1 | 7/2010 | Elmoalem et al. | |

FOREIGN PATENT DOCUMENTS

| | | |
|---|---|---|
| CN | 102098096 A | 6/2011 |
| CN | 102142893 A | 8/2011 |
| JP | 2009-053079 A | 3/2009 |
| KR | 10-1043099 B1 | 6/2011 |
| WO | WO 2010-042567 A1 | 4/2010 |

* cited by examiner

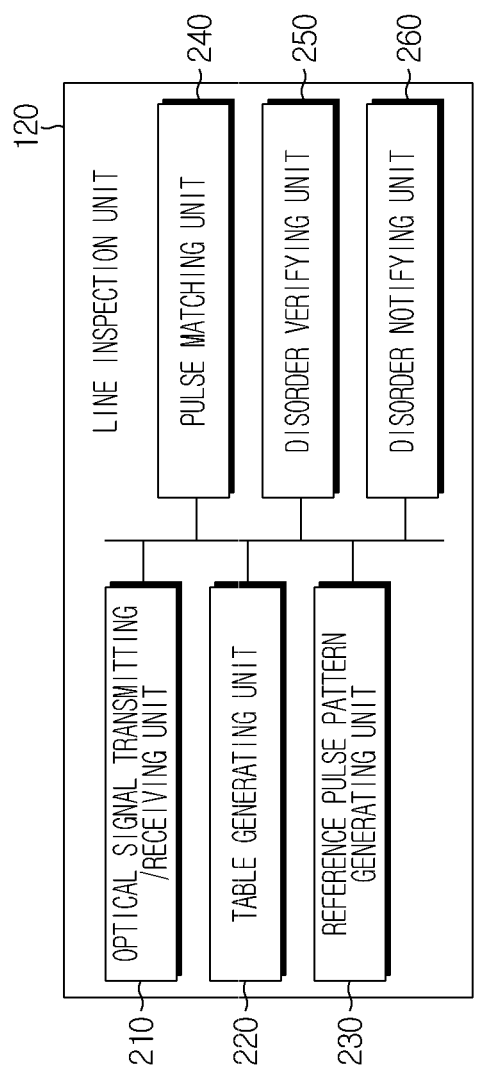

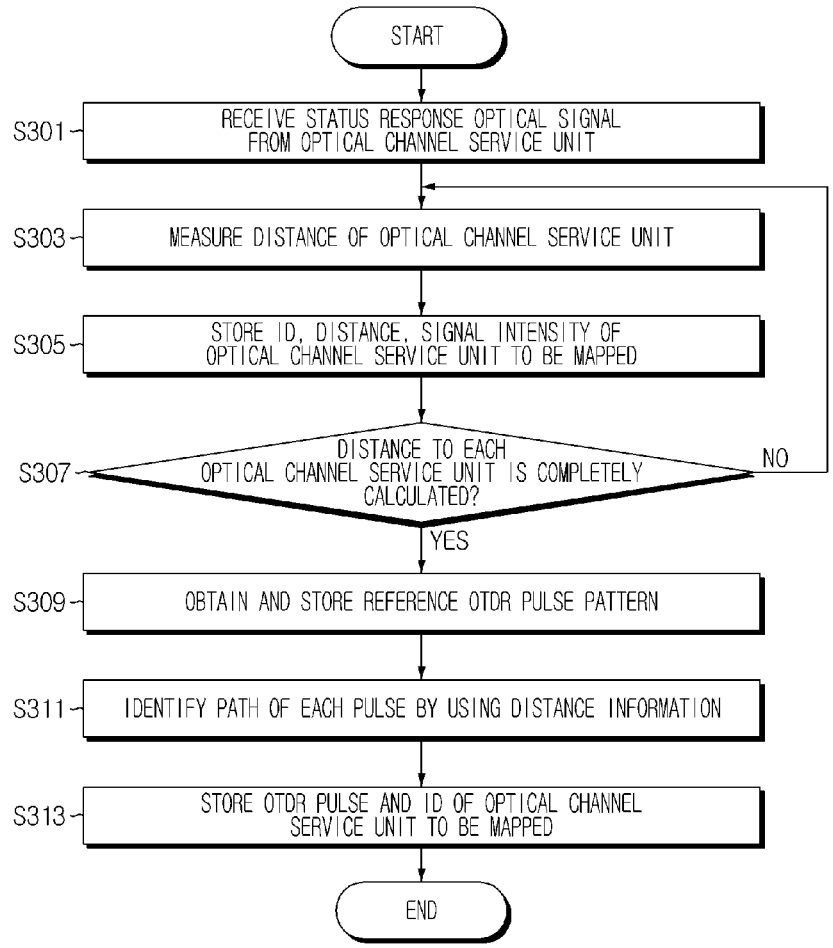

OPTICAL LINE MONITORING SYSTEM AND METHOD

TECHNICAL FIELD

Cross-Reference to Related Application

The present application claims priority to Korean Patent Application No. 10-2011-0103744 filed on Oct. 11, 2011 and Korean Patent Application No. 10-2012-0016530 filed on Feb. 17, 2012 in the Republic of Korea, the disclosures of which are incorporated herein by reference.

The present disclosure relates to an optical line monitoring technique, and more particularly, to an optical line monitoring system and method which detects an optical line where a disorder occurs, by using an OTDR (Optical Time Domain Reflectometer) pulse pattern with matching information.

BACKGROUND ART

Optical cables are widely used for ultrahigh communication networks due to its low loss and large bandwidth in comparison to copper wires. However, optical cables have somewhat low reliability due to inferior mechanical properties in comparison to copper wires. In other words, optical cables are easily cut in comparison to copper wires and when bent beyond a certain angle, does not allow for communication. Therefore, when a service provider who constructed an optical communication network finds a disorder with the optical cable, he/she quickly checks to find the location of the disorder and puts workers at the location to recover the optical line.

Meanwhile, a technique of checking a disorder of an optical line by using an optical measurement instrument has been disclosed. In detail, the optical measurement instrument delivers OTDR (Optical Time Domain Reflectometer) pulses to a plurality of optical channel service units connected to a distribution unit, and analyzes a plurality of OTDR pulses (namely, a pulse pattern), which are reflected by the plurality of optical channel service units and then consecutively return, to inspect a disorder of each line.

However, even though a disorder of a specific OTDR pulse signal may be checked by analyzing a plurality of OTDR pulses obtained through the optical measurement instrument, it is impossible to specify which individual optical line receives an individual OTDR pulse. In other words, it is impossible to identify an optical channel service unit by which each of the plurality of OTDR pulses received through the optical measurement instrument is reflected.

Workers may, of course, check a final length of an extended optical line of each optical channel service unit and then identify an individual optical line of an OTDR pulse where the disorder status was found, with reference to the information about the plurality of checked lengths. However, this method requires manual work in order to check the length of an optical line, which also consumes a lot of labor costs.

Meanwhile, the OTDR pulse pattern showing a plurality of OTDR pulses exhibits pulses consecutively according to length. Here, pulses returning from a plurality of optical channel service units located at identical or similar distances based on the optical measurement instrument may be shown in the OTDR pulse pattern as being combined in a single waveform. In other words, a plurality of pulses returning from optical lines with identical or similar lengths are combined into a single pulse, and the combined pulse is shown in the OTDR pulse pattern.

In the case a plurality of pulses returning from optical lines located at identical or similar lengths are combined in a single pulse, the optical line monitoring system may not distinguish each optical line with regard to overlapping pulses in the OTDR pulse pattern. Further, in the case a disorder occurs at a specific optical line among the plurality of optical lines via which the overlapping pulses pass, the optical line monitoring system may not accurately identify an optical line where the disorder occurs, which may delay actions to cope with the disorder.

DISCLOSURE OF INVENTION

Technical Problem

The present disclosure is designed to solve the problems of the prior art, and therefore it is an object of the present disclosure to provide an optical line monitoring system and method, which may identify an optical line where a disorder occurs, based on a OTDR pulse pattern matched with identification information of an optical channel service unit, stored in a database.

Further, the present disclosure is directed to providing an optical line monitoring system and method, which may accurately detect an optical line where a disorder occurs, among a plurality of optical lines at identical or similar distances in the OTDR pulse pattern.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Solution to Problem

In one aspect of the present disclosure, there is a provided an optical line monitoring method for monitoring a disorder of an optical line by using an optical line monitoring system, which includes (a) delivering status request optical signals to a plurality of optical channel service units and receiving a status response optical signal from each optical channel service unit; (b) measuring a distance of each optical channel service unit based on a round-trip delay time of the received status response optical signal and storing the distance of each optical channel service unit as a reference status information table to be mapped with identification information of the corresponding optical channel service unit; (c) delivering an OTDR (Optical Time Domain Reflectometer) pulse to each optical channel service unit which is in normal operation, receiving a plurality of individual OTDR pulses returned by reflection, and storing a reference OTDR pulse pattern exhibited by the plurality of individual OTDR pulses; and (d) checking a distance of each individual pulse in the reference OTDR pulse pattern, and matching each individual pulse with the identification information of each optical channel service unit so that a proximity order of the individual pulses is identical to a proximity order of the optical channel service units in the reference status information table.

In another aspect of the present disclosure, there is also provided an optical line monitoring system, which includes a database for storing a reference status information table where identification information of an optical channel service unit is mapped with a distance of the optical channel service unit and storing a reference OTDR (Optical Time Domain Reflectometer) pulse pattern where a plurality of individual pulses are exhibited; and a pulse matching unit for matching the identification information of each optical channel service unit with the individual pulses exhibited in the reference OTDR pulse pattern so that a proximity order of the individual pulses exhibited in the reference OTDR pulse pattern is identical to a proximity order of the optical channel service units in the reference status information table.

Advantageous Effects of Invention

The present disclosure may save working hours and labor costs required for monitoring optical lines by measuring and storing a distance of an optical channel service unit and automatically identifying an optical line of each pulse shown in an OTDR (Optical Time Domain Reflectometer) pulse pattern by using the stored distance information.

In addition, the present invention may shorten a release time of an optical line and improve work efficiency by accurately figuring out a path via which an abnormal pulse passes, recognizing the path as a path where a disorder occurs, and reporting the path to a manager.

In particular, the present disclosure allows a disorder of an optical line to be thoroughly verified by additionally inspecting a disorder of optical lines at identical or similar distances, which has not been detected through the comparison of an OTDR pulse pattern.

BRIEF DESCRIPTION OF DRAWINGS

Other objects and aspects of the present disclosure will become apparent from the following descriptions of the embodiments with reference to the accompanying drawings in which:

FIG. 2 is a diagram showing a line inspection unit according to an embodiment of the present disclosure;

FIG. 3 is a flowchart for illustrating a method for matching a reference OTDR pulse pattern with identification information of an optical channel service unit in an optical line monitoring system according to an embodiment of the present disclosure;

FIG. 4 is a diagram showing a reference OTDR pulse pattern according to an embodiment of the present disclosure;

BEST MODE FOR CARRYING OUT THE INVENTION

The above objects, features and advantages will be more apparent through the following detailed description in relation to the accompanying drawings, and accordingly the technical spirit of the present disclosure can be easily implemented by those having ordinary skill in the art. In addition, if detailed description of a known technique relating to the present disclosure can make the substance of the present disclosure unnecessarily vague, the detailed description will be omitted. Hereinafter, a preferred embodiment of the present disclosure will be described in detail with reference to the accompanying drawings.

Figure 1:
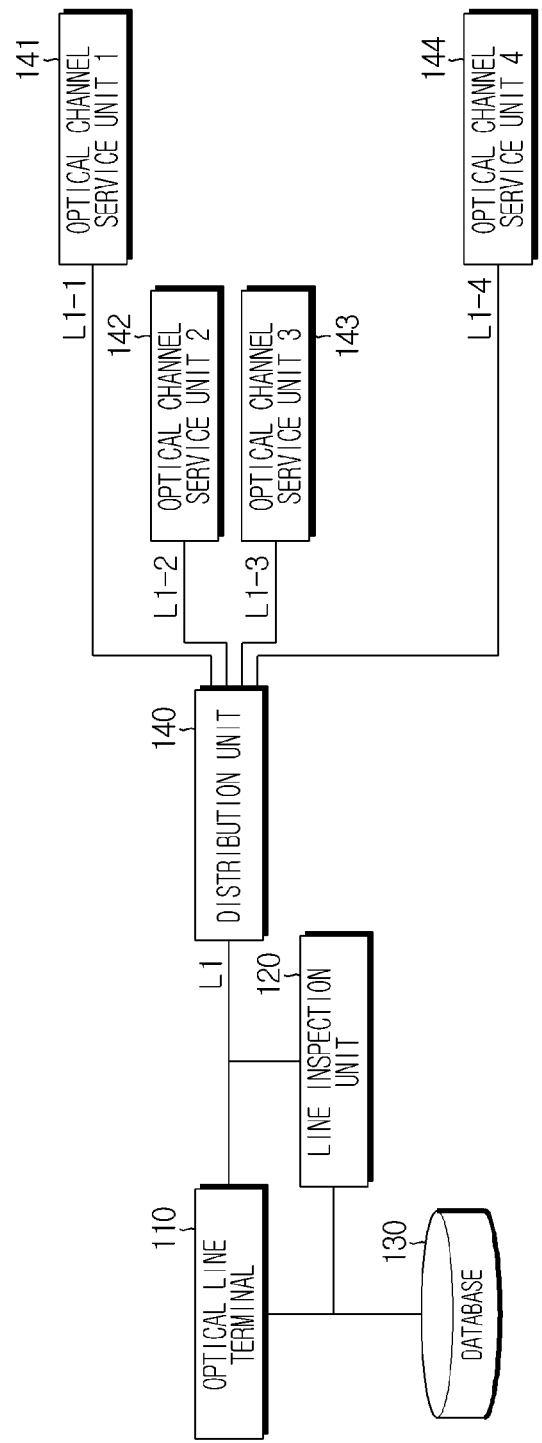
FIG. 1 is a diagram showing an optical line monitoring system according to an embodiment of the present disclosure.

FIG. 1 is a diagram showing an optical line monitoring system according to an embodiment of the present disclosure.

As shown in FIG. 1, an optical line monitoring system according to the present disclosure includes an optical line terminal 110, a line inspection unit 120, a database 130, distribution unit 140 and optical channel service units 141, 142, 143, 144.

Even though FIG. 1 shows a single optical line terminal 110, a plurality of optical line terminals, and other distribution units and optical channel service units connected to the optical line terminals may also be included in the optical line monitoring system.

The optical channel service units 141, 142, 143, 144 are ONU (Optical Network Unit), ONT (Optical Network Terminal) or the like and form a subscriber network of a certain scale to provide an optical communication service interface to final users. The optical channel service units 141, 142, 143, 144 are implemented to receive FTTC (fiber to the curb), FTTB (fiber to the building), FTTF (fiber to the floor), FTTO (fiber to the office) or the like and connected to a plurality of final user terminals (for example, general-purpose computers, telephones or the like). At this time, the optical channel service units 141, 142, 143, 144 may be connected to a final user terminal (for example, a computer) by means of an electric cable, and in this case, the optical channel service units 141, 142, 143, 144 converts an optical signal received from the optical line terminal 110 into an electric signal and transmits the electric signal to the user terminal, and converts an electric signal received from the user terminal into an optical signal and transmits the optical terminal via the distribution unit 140 to the optical line terminal 110. The optical channel service units 141, 142, 143, 144 are mostly installed in subscriber concentrated areas.

The distribution unit 140 performs a function of diverging a single optical line L1 extending from the optical line terminal 110 into a plurality of optical lines L1-1, L1-2, L1-3, L1-4. In other words, the distribution unit 140 distributes the optical signals received from the optical line terminal 110 into receiver terminals. Further, the distribution unit 140 combines optical signals received from the optical channel service units 141, 142, 143, 144 and transmits the combined optical signal to the optical line terminal 110.

In order to form more optical lines, a plurality of distribution units 140 may be installed. In other words, a primary distribution unit connected to the optical line terminals 140 to primarily distribute optical lines may be installed in a communication network, and additionally a secondary distribution unit connected between the primary distribution unit and the optical channel service units 141, 142, 143, 144 to secondarily distribute the optical lines may be installed in the optical communication network.

The optical line terminal (OLT) 110 performs a function of connecting a backbone network and a subscriber network located at a specific area to each other. The optical line terminal 110 is connected to the distribution unit 140 by means of a single optical line L1. In addition, the optical line terminal 110 performs point-to-multipoint communication with a plurality of optical channel service units 141, 142, 143, 144 through the distribution unit 140.

The database 130 stores a reference status information table where identification information, distance information and optical signal intensity information of the optical channel service units 141, 142, 143, 144 are mapped. At this time, in the case there are a plurality of optical line terminals 110, the database 130 stores the reference status information table in a classified pattern for each optical line terminal 110. In other words, in the case there are a plurality of optical line terminals 110, the database 130 stores the reference status information table, where ID of the optical channel service unit communicating with the corresponding optical line terminal 110, distance information to the optical channel service units 141, 142, 143, 144 and optical signal intensity information are mapped, in a classified pattern for each optical line terminal 110. In addition, the database 130 stores a reference OTDR (Optical Time Domain Reflectometer) pulse pattern, and also may store disorder history information about each of the optical channel service units 141, 142, 143, 144. The reference OTDR pulse pattern means an OTDR pulse pattern of normal quality, obtained when the optical line and the optical channel service units 141, 142, 143, 144 are normal.

The line inspection unit 120 is connected to a single optical line L1 extending from the optical line terminal 110 and performs a function of analyzing whether a disorder occurs at each optical line. The line inspection unit 120 may be connected to the single optical line L1 through an optical switch unit (not shown). In addition, the line inspection unit 120 may transmit a status request optical signal to each optical channel service unit 141, 142, 143, 144, which is in normal operation, and analyze a status response optical signal received accordingly to check a distance to each optical channel service unit 141, 142, 143, 144 and intensity of the status response optical signal. Moreover, the optical line terminal 110 maps the checked distance to the optical channel service units 141, 142, 143, 144 and the checked intensity of the optical signal with the identification information of the corresponding optical channel service units 141, 142, 143, 144, and stores the mapping information in the database 130 as a reference status information table.

Further, the line inspection unit 120 extracts the reference OTDR pulse pattern from the database 130, and matches the identification information of the optical channel service units 141, 142, 143, 144 with each individual pulse, based on the distance of each individual pulse exhibited in the reference OTDR pulse pattern and the distance information of each optical channel service unit 141, 142, 143, 144 in the status information table.

Meanwhile, if an inspection time comes, the line inspection unit 120 transmits to the optical line and compares an OTDR pulse pattern of OTDR-based pulses, which are reflected from the optical channel service units 141, 142, 143, 144 and consecutively return, with the reference OTDR pulse pattern stored in the database 130 to verify whether a disorder occurs in the optical line. At this time, the line inspection unit 120 identifies diverged optical lines L1-1, L1-2, L1-3, L1-4 exhibiting an OTDR pulse where a disorder occurs and optical channel service units 141, 142, 143, 144 included in the diverged optical lines, with reference to the reference OTDR pulse pattern matched with the identification information of the optical channel service unit.

In addition, the line inspection unit 120 transmits a status information optical signal to each optical channel service unit 141, 142, 143, 144 and analyzes a status response optical signal received accordingly, and then compares the intensity of the optical signal and the distance of each analyzed optical channel service unit 141, 142, 143, 144 with the data of the reference status information table stored in the database 130 to verify whether a disorder occurs in specific diverged optical lines L1-1, L1-2, L1-3, L1-4.

The optical line terminal 110, the line inspection unit 120 and the database 130 are generally installed at a management center of a communication service provider.

FIG. 2 is a diagram showing the line inspection unit according to an embodiment of the present disclosure.

As shown in FIG. 2, the line inspection unit 120 according to an embodiment of the present disclosure includes an optical signal transmitting/receiving unit 210, a table generating unit 220, a reference pulse pattern generating unit 230, a pulse matching unit 240, a disorder verifying unit 250 and a disorder notifying unit 260.

The optical signal transmitting/receiving unit 210 is connected to a single optical line L1 extending from the optical line terminal 110, delivers optical signals to the optical channel service units 141, 142, 143, 144 through the single optical line L1, and receives optical signals delivered from the optical channel service units 141, 142, 143, 144. The optical signal transmitting/receiving unit 210 may be connected to the single optical line L1 through an optical switch unit (not shown).

The table generating unit 220 performs a function of generating a reference status information table (see Table 1) and storing the reference status information table in the database 130. In detail, in a state where the optical channel service units 141, 142, 143, 144 and the optical lines L1, L1-1, L1-2, L1-3, L1-4 are all in normal operation, the table generating unit 220 transmits a status request optical signal to each optical channel service unit 141, 142, 143, 144 by using the optical signal transmitting/receiving unit 210 and accordingly receives a status response optical signal from each optical channel service unit 141, 142, 143, 144. In addition, the table generating unit 220 decodes and analyzes the received status response optical signal to measure a distance to each optical channel service unit 141, 142, 143, 144 and intensity of each status response optical signal, and maps the identification information of the optical channel service units 141, 142, 143, 144, the intensity of the optical signal and the distance information and stores the mapped data in the database 130 as a reference status information table.

The reference pulse pattern generating unit 230 performs a function of delivering an optical signal by using the optical signal transmitting/receiving unit 210 and generating a reference OTDR pulse pattern based on the optical signal received from the optical channel service units 141, 142, 143, 144. In other words, in a state where the optical channel service units 141, 142, 143, 144 and the optical lines L1, L1-1, L1-2, L1-3, L1-4 are all in normal operation, the reference pulse pattern generating unit 230 delivers an OTDR pulse to each optical channel service unit 141, 142, 143, 144 by using the optical signal transmitting/receiving unit 210 and receives a plurality of OTDR individual pulses returned by reflection. Further, the reference pulse pattern generating unit 230 sets a pattern exhibited by the plurality of received OTDR individual pulses as a reference OTDR pulse pattern (see FIG. 4) and stores the reference OTDR pulse pattern in the database 130.

The pulse matching unit 240 performs a function of matching the individual pulses exhibited in the OTDR pulse pattern with the optical channel service units 141, 142, 143, 144, based on the distance information of the reference OTDR pulse pattern of the database 130 and the distance information of the reference status information table. In detail, the pulse matching unit 240 checks the distance information of each optical channel service unit 141, 142, 143, 144 in the reference status information table (see Table 1) of the database 130, and stores the identification information of the optical channel service units 141, 142, 143, 144 in the database 130 to be matched with each individual pulse so that a proximity order of the individual pulses exhibited in the reference OTDR pulse pattern is identical to a proximity order of the optical channel service units 141, 142, 143, 144. At this time, the pulse matching unit 240 checks whether the number of identification information of the optical channel service units 141, 142, 143, 144 recorded in the reference status information table is identical to the number of individual pulses exhibited in the OTDR pulse pattern, and if so, matches the identification information of the optical channel service units 141, 142, 143, 144 with the individual pulses exhibited in the OTDR pulse pattern in a one-to-one relation. Meanwhile, in the case the number of identification information of the optical channel service units 141, 142, 143, 144 recorded in the reference status information table is not identical to the number of individual pulses exhibited in the OTDR pulse pattern, the pulse matching unit 240 determines that a plurality of pulses overlap into a single pulse, and so checks a plurality of optical channel service units 141, 142, 143, 144 which have the same distance information or whose difference in distance is not greater than a threshold value (for example, 20 m) in the reference status information table and matches the identification information of the plurality of optical channel service units 141, 142, 143, 144 with a single individual pulse.

If an inspection time comes, the disorder verifying unit 250 performs a function of verifying a disorder of each optical line L1, L1-1, L1-2, L1-3, L1-4 by using the optical signal transmitting/receiving unit 210. In detail, the disorder verifying unit 250 delivers an OTDR pulse to each optical line by using the optical signal transmitting/receiving unit 210 to collect an OTDR pulse, then compares the collected OTDR pulse pattern with the reference OTDR pulse pattern of the database 130 to verify a disorder of each optical line L1, L1-1, L1-2, L1-3, L1-4, and identifies an optical line where a disorder occurs. At this time, the disorder verifying unit 250 determines whether a disorder region may be recognized by comparing the reference OTDR pulse pattern and the OTDR pulse pattern, and then, if not, checks a plurality of optical channel service units 141, 142, 143, 144 having identical or similar distances in the reference OTDR pattern information matched with the identification information of the optical channel service units. Further, the disorder verifying unit 250 delivers a status request optical signal to each of the plurality of checked optical channel service units 141, 142, 143, 144 by using the optical signal transmitting/receiving unit 210, and analyzes a status response optical signal received accordingly to identify optical lines L1, L1-1, L1-2, L1-3, L1-4 where a disorder occurs.

In addition, in the case the collected OTDR pulse pattern and the reference OTDR pulse pattern are similar to each other over a threshold value (for example, 95%), in order to more accurately verify a disorder of diverged optical lines L1-1, L1-2, L1-3, L1-4 having identical or similar distance information, the disorder verifying unit 250 delivers a status request optical signal to each of the plurality of optical channel service units 141, 142, 143, 144, and analyzes a status response optical signal received accordingly to verify a disorder of each diverged optical line L1-1, L1-2, L1-3, L1-4.

If a disorder of a specific optical line is detected by the disorder verifying unit 250, the disorder notifying unit 260 checks identification information of the optical channel service units 141, 142, 143, 144 included in the optical line, generates disorder generation information recording the identification information of the corresponding optical channel service units 141, 142, 143, 144, and then notifies the disorder generation information to a manager by using an email or a mobile phone number of the manager previously stored.

A method for monitoring a status of an optical line by the optical line monitoring system according to the present disclosure will be described in more detail with reference to FIGS. 3 to 6.

FIG. 3 is a flowchart for illustrating a method for matching a reference OTDR pulse pattern with identification information of an optical channel service unit in the optical line monitoring system according to an embodiment of the present disclosure.

Referring to FIG. 3, in a state where the optical channel service units 141, 142, 143, 144 and the optical lines L1, L1-1, L1-2, L1-3, L1-4 are all in normal operation, the table generating unit 220 of the line inspection unit 120 transmits a status request optical signal to an optical channel service unit 1 141 by using the optical signal transmitting/receiving unit 210. If so, the optical channel service unit 1 141 delivers a status response optical signal recording its identification information, and the table generating unit 220 receives the status response optical signal through the optical signal transmitting/receiving unit 210 (S301).

Subsequently, the table generating unit 220 checks a round-trip delay time from the time point when the status request optical signal is transmitted to the time point when the status response optical signal is received, and decodes the status response optical signal to check the identification information of the optical channel service unit 1 141 recorded in the status response optical signal. Next, the table generating unit 220 measures a distance to the optical channel service unit 1 141 by using Equation 1 below (S303).

$$D = \frac{C(t-dt)}{2n} \qquad \text{Equation 1}$$

D: distance between an optical line terminal and an end terminal
n: refractive index
dt: the sum of delay time of each unit
t: round-trip delay time
C: speed of light Here, 'dt' represents the sum of an internal delay time consumed for the distribution unit 140 to relay an optical signal (namely, the status request optical signal and the status response optical signal) and a delay time consumed for the optical channel service units 141, 142, 143, 144 to deliver a status response optical signal, and the line inspection unit 120 may receive and store the delay times of the distribution unit 140 and the optical channel service units 141, 142, 143, 144 from the manager.

The table generating unit 110 which measures a distance to the optical channel service unit 1 141 measures an intensity of the status response optical signal received from the optical channel service unit 1 141. Subsequently, the table generating unit 220 maps the identification information of the optical channel service unit 1 141, the intensity of the status response optical signal and the distance measured in Step S303, and stores the mapped information in the database 130 as the reference status information table (S305). Next, the table generating unit 220 checks whether the distances to all available optical channel service units 141, 142, 143, 144 are completely measured, and if not, performs Step S301 again to measure distances to remaining optical channel service units 2,3,4 142, 143, 144 and intensities of the status response optical signal received from the corresponding optical channel service units 142, 143, 144, respectively, and records the identification information of the optical channel service units 142, 143, 144, the distances to the optical channel service units 142, 143, 144 and the intensities of the status response optical signals received from the optical channel service units 142, 143, 144 in the reference status information table of the database 130 (S307).

Meanwhile, the table generating unit 220 may measure the distance to each optical channel service unit 141, 142, 143, 144 and the intensity of the optical signal by transmitting the status request optical signals to the optical channel service units 141, 142, 143, 144 at once and analyzing a plurality of status response optical signals consecutively received from the optical channel service units 141, 142, 143, 144. In other words, the table generating unit 220 may also measure the distance to each optical channel service unit 141, 142, 143, 144 and the intensity of the optical signal by broadcasting or multicasting status request optical signals and analyzing a plurality of status request optical signals received accordingly.

Table 1 below shows the reference status information table according to an embodiment of the present disclosure.

TABLE 1

| Optical channel service unit ID | Intensity of an optical signal (dBm) | Distance |
|---|---|---|
| ONT1 | −28 | 15.5 km |
| ONT2 | −27 | 13 km |
| ONT3 | −27.5 | 13 km |
| ONT4 | −28.5 | 17 km |

As shown in Table 1, if the distance to each optical channel service unit 141, 142, 143, 144 connected to the optical line terminal 110 and the intensity of the optical signal are completely measured, the database 130 stores a reference status information table where the identification information of the optical channel service units 141, 142, 143, 144, the intensity of the optical signal and the distances to the optical channel service units 141, 142, 143, 144 are mapped.

Next, in a state where the optical channel service units 141, 142, 143, 144 and the optical lines L1, L1-1, L1-2, L1-3, L1-4 are all in normal operation, the reference pulse pattern generating unit 230 delivers an OTDR pulse to each optical channel service unit 141, 142, 143, 144 by using the optical signal transmitting/receiving unit 210 and receives a plurality of OTDR individual pulses returned by reflection. Subsequently, the reference pulse pattern generating unit 230 sets a pattern exhibited by the plurality of OTDR individual pulses as the reference OTDR pulse pattern (see FIG. 4) and stores the pattern in the database 130 (S309).

If so, the pulse matching unit 240 checks the distance information of each optical channel service unit 141, 142, 143, 144 in the reference status information table (see Table 1) of the database 130, and recognizes a path of each individual pulse exhibited in the reference OTDR pulse pattern by using the distance information (S311). In detail, the pulse matching unit 240 checks a proximity order of the optical channel service units 141, 142, 143, 144, based on the distance information recorded in the reference status information table. For example, in the case the distance information as shown in Table 1 is extracted from the database 130, the pulse matching unit 240 determines the proximity order as being the optical channel service unit 2 142, the optical channel service unit 3 143, the optical channel service unit 1 141, and the optical channel service unit 4 144. At this time, the line inspection unit 120 recognizes that the optical channel service unit 2 142 and the optical channel service unit 3 143 have the identical distance.

Subsequently, the pulse matching unit 240 checks the distance information of each individual pulse in the reference OTDR pulse pattern, and stores each individual pulse in the database 130 to be matched with the identification information of the optical channel service units 141, 142, 143, 144 so that the proximity order of the individual pulses is identical to the proximity order of the optical channel service units 141, 142, 143, 144 (S313).

At this time, the pulse matching unit 240 checks whether the number of the identification information of the optical channel service units stored in the reference status information table is identical to the number of individual pulses exhibited in the reference OTDR pulse pattern, and if so, matches the identification information of the optical channel service units 141, 142, 143, 144 with the individual pulses of the reference OTDR pulse pattern in a one-to-one relation so that the proximity order of the individual pulse is identical to the proximity order of the optical channel service units 141, 142, 143, 144. Meanwhile, in the case the number of the identification information of the optical channel service units is not identical to the number of the individual pulses exhibited in the reference OTDR pulse pattern, the pulse matching unit 240 determines that a plurality of individual pulses overlap into a single pulse. In addition, the pulse matching unit 240 checks identification information of a plurality of optical channel service units which have the same distance information or whose difference in distance is not greater than a threshold value (for example, 20 m) in the reference status information table, and matches the identification information of the plurality of optical channel service units with the same individual pulse.

FIG. 4 is a diagram showing a reference OTDR pulse pattern according to an embodiment of the present disclosure.

Referring to FIG. 4, in the reference OTDR pulse, the Y axis represents intensity and the X axis represents distance. In other words, in the reference OTDR pulse pattern, the pulse intensity increases from the bottom to the top based on the Y axis, and the distance increases from the left to the right based on the X axis. In the reference OTDR pulse pattern of FIG. 4, the order of proximity of pulses in the pattern is a pulse 410, a pulse 420, and a pulse 430. In other words, in the reference OTDR pulse pattern, the pulse 410 is closest and the pulse 430 is farthest.

In the case the reference status information table as shown in Table 1 and the reference OTDR pulse pattern as shown in FIG. 4 are stored in the database 130, the pulse matching unit 240 checks that the number of optical channel service units 141, 142, 143, 144 (namely, 4) is not identical to the number of individual pulses (namely, 3) exhibited in the OTDR pulse pattern, and accordingly determines that two OTDR pulses overlap into a single pulse. In addition, the pulse matching unit 240 checks that the optical channel service units with the same distance information or the similar distance information whose difference in distance is not greater than a threshold value (for example, 20 m) are the optical channel service unit 2 142 and the optical channel service unit 3 143 from the reference status information table of Table 1.

Next, the pulse matching unit 240 matches the pulse 420 exhibited in the reference OTDR pulse pattern of FIG. 4 with the identification information ONT1 of the optical channel service unit 1 141 with the distance information having a third proximity order, and matches the pulse 430 with the identification information of the optical channel service unit 4 ONT4 with the distance information having a last proximity order. In addition, the pulse matching unit 240 matches the identification information of the optical channel service unit 2 142 and the identification information of the optical channel service unit 3 143 having the same distance information and a first proximity order with the pulse 410. In other words, the pulse matching unit 240 matches the identification information of the optical channel service units 2,3 142, 143 having the same distance information with a single OTDR pulse 410 to overlap each other. In this case, the pulse matching unit 240 stores the reference OTDR pulse pattern matched with the identification information of the optical channel service units 141, 142, 143, 144 in the database 130.

If the reference OTDR pulse pattern stored as above is used, paths L1-1, L1-2, L1-3, L1-4 of the pulses exhibited in the OTDR pulse pattern may be identified.

Figure 5:
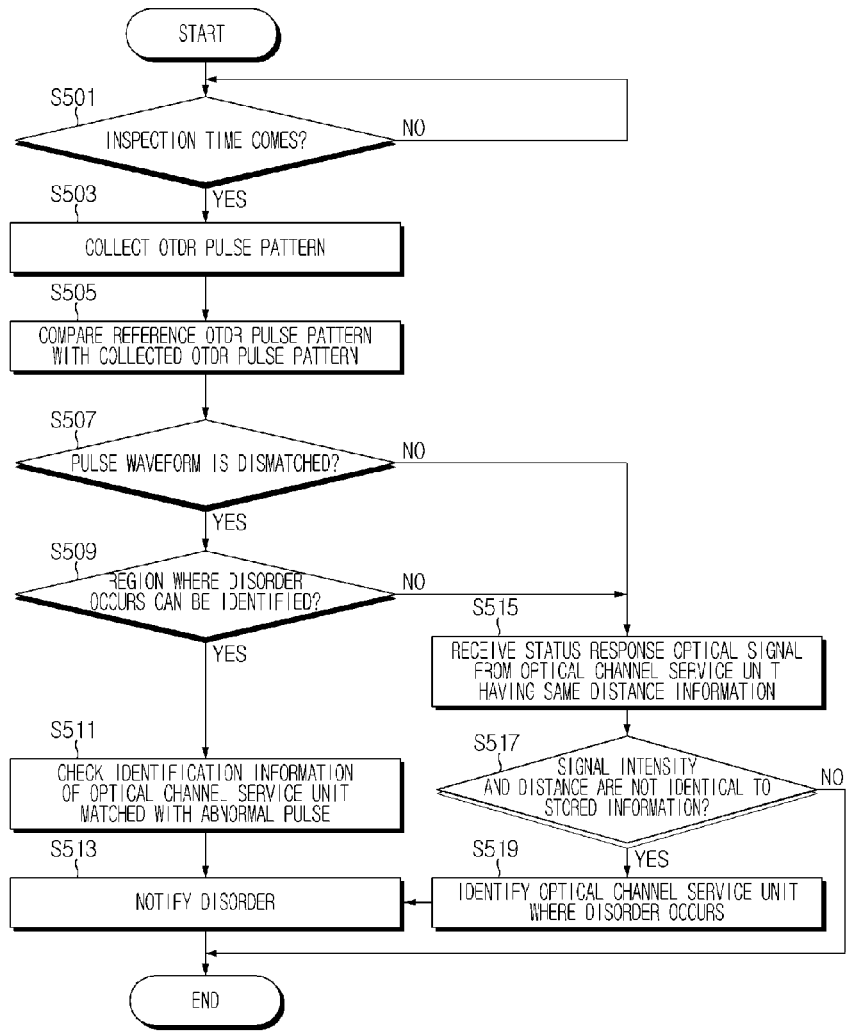
FIG. 5 is a flowchart for illustrating a method for verifying a disorder of an optical line in an optical line monitoring system according to an embodiment of the present disclosure.

FIG. 5 is a flowchart for illustrating a method for verifying a disorder of an optical line in the optical line monitoring system according to an embodiment of the present disclosure.

Figure 6:
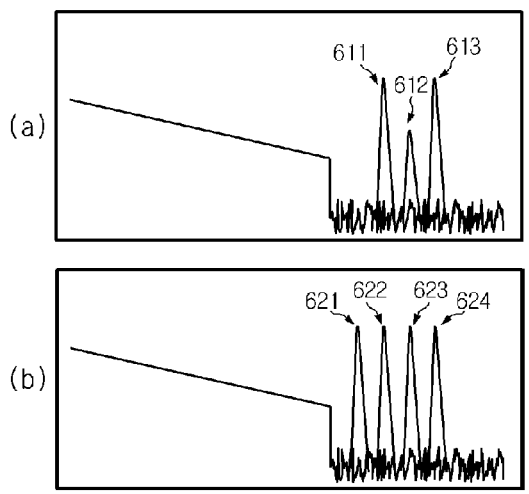
FIG. 6 is a diagram showing an OTDR pulse pattern collected by the line inspection unit according to an embodiment of the present disclosure.

FIG. 6 is a diagram showing an OTDR pulse pattern collected by the line inspection unit according to an embodiment of the present disclosure.

Referring to FIGS. 5 and 6, the disorder verifying unit 250 of the line inspection unit 120 checks whether an optical line inspection time comes, and, if the inspection time comes, delivers an OTDR pulse to each optical channel service unit 141, 142, 143, 144 by using the optical signal transmitting/receiving unit 210, and consecutively receives a plurality of OTDR individual pulses returned by reflection from the optical channel service units 141, 142, 143, 144, thereby collecting an OTDR pulse pattern of the optical line connected to the optical line terminal 110 (S501, S503).

Subsequently, the disorder verifying unit 250 extracts a reference OTDR pulse pattern matched with the identification information of each optical channel service unit 141, 142, 143, 144 from the database 130, and compares the reference OTDR pulse pattern with the collected OTDR pulse pattern to check a concordance rate of both pulse patterns (S505).

Next, in the case where the concordance rate is not greater than a threshold value (for example, 95%) as a result of the comparison, the disorder verifying unit 250 determines whether a disorder region may be identified by comparing the reference OTDR pulse pattern with the collected OTDR pulse pattern (S507, S509). At this time, the disorder verifying unit 250 identifies an optical line region where a disorder occurs by checking whether an individual pulse whose intensity is not identical to that of each individual pulse exhibited in the reference OTDR pulse pattern is present in the collected OTDR pulse pattern.

As an example based on FIGS. 4 and 6, in the case where the OTDR pulse pattern shown in (a) of FIG. 6 is collected, the disorder verifying unit 250 may check that the pulse 612 is a mismatched individual pulse, based on a concordance rate between the reference OTDR pulse pattern shown in FIG. 4 and the OTDR pulse pattern collected at the inspection time as shown in (a) of FIG. 6, and identify that the identification information of the optical channel service unit matched with the pulse 612 represents the optical channel service unit 1 ONT1.

Meanwhile, in the case the OTDR pulse pattern shown in (b) of FIG. 6 is collected, the disorder verifying unit 250 may check that a concordance rate between the reference OTDR pulse pattern shown in FIG. 4 and the OTDR pulse pattern collected at the inspection time as shown in (b) of FIG. 6 is less than a threshold value. However, even though the disorder verifying unit 250 may recognize that individual pulses (namely, 622, 623, 624) identical to the individual pulses 410, 420, 430 of the reference OTDR pulse pattern (FIG. 4) are present in the OTDR pulse pattern ((b) of FIG. 6), the disorder verifying unit 250 may not identify a diverged optical line L1-1, L1-2, L1-3, L1-4 in the collected OTDR pulse pattern ((b) of FIG. 6) through which a new pulse 621 is introduced. One of the reasons why a new pulse 621 is generated may be that a breaking disorder occurs in regions L1-2, L1-3 with identical or similar distances to cause Fresnel reflection.

If a disorder region may be identified by comparing the reference OTDR pulse pattern and the collected OTDR pulse pattern as a result of the determination, the disorder verifying unit 250 checks an individual pulse mismatched with the reference OTDR pulse pattern, among the individual pulses exhibited in the collected OTDR pulse pattern as a result of the determination. Subsequently, the disorder verifying unit 250 checks the identification information of the optical channel service units 141, 142, 143, 144 matched with the mismatched individual pulse in the reference OTDR pulse pattern having the matching information (S511).

Then, the disorder notifying unit 260 recognizes that a disorder occurs in the optical line in which the checked optical channel service units 141, 142, 143, 144 are included, and notifies the disorder generation information to the manager (S513). At this time, the disorder notifying unit 260 checks the identification information of the optical channel service units 141, 142, 143, 144 included in the optical line where a disorder occurs in the reference OTDR pulse pattern having the matching information, generates disorder generation information recording the identification information of the checked optical channel service units 141, 142, 143, 144, and then notifies the disorder generation information to the manager by using an email or mobile phone number of the manager previously stored.

As an example based on (a) of FIG. 6, the disorder verifying unit 250 compares the OTDR pulse pattern collected at the inspection time as shown in (a) of FIG. 6 and the reference OTDR pulse pattern of FIG. 4, and checks that the individual pulses 611, 613 in the OTDR pulse pattern shown in (a) of FIG. 6 are identical to the individual pulses 410, 430 but the individual pulse 612 is not identical to the individual pulse 420. Then, the disorder verifying unit 250 checks the identification information of the optical channel service unit matched with the individual pulse of the individual pulse 612 in the reference OTDR pulse pattern having the matching information in order to identify a path along which the individual pulse 612 is introduced. In other words, the disorder verifying unit 250 verifies that a disorder occurs in the optical line path (namely, L1-1) in which the optical channel service unit 1 141 reflecting the individual pulse 612 is included. If so, the disorder notifying unit 260 generates disorder generation information recording the identification information ONT1 of the optical channel service unit 1 141 and notifies the disorder generation information to the manager. Accordingly, the manager determines that a disorder occurs in a path in which the optical channel service unit 1 141 is included, and then preferably inspects the corresponding path and restores the disorder.

Meanwhile, in Step S509, if it is impossible to identify a disorder region by comparing the reference OTDR pulse pattern with the collected OTDR pulse pattern, the disorder verifying unit 250 checks the identification information of a plurality of optical channel services matched with the individual pulse to overlap each other from the reference OTDR pulse pattern having the matching information. Subsequently, the disorder verifying unit 250 delivers a status request optical signal to each of the plurality of checked optical channel service units 142, 143 by using the optical signal transmitting/receiving unit 210, and receives a status response optical signal from each of the plurality of optical channel service units 142, 143 (S515). Subsequently, the disorder verifying unit 250 analyzes the status response optical signal to measure distances to the corresponding optical channel service units 142, 143 and intensity of the status response optical signal. At this time, the disorder verifying unit 250 may calculate the distances to the optical channel service units 142, 143 by using Equation 1 above.

Next, the disorder verifying unit 250 checks whether the measured distance or optical signal intensity is different from the information of the reference status information table over a reference value (for example, 30 m in distance and 2 dBm in signal intensity), for each of the corresponding optical channel service units 142, 143 by comparing the measured distance and optical signal intensity with the information of the reference status information table (S517). At this time, the disorder verifying unit 250 checks the identification information of the optical channel service units 142, 143 whose distance and signal intensity have been measured, extracts the distance information and the optical signal intensity information mapped with the identification information from the reference status information table, and then compares the measured distance and optical signal intensity with the extracted distance information and the extracted signal intensity information, respectively.

Subsequently, in the case either of the measured distance and the measured optical signal intensity is different from the information of the reference status information table over a reference value, the disorder verifying unit 250 checks the identification information of the optical channel service units 142, 143 which have delivered the optical signal, and determines that a disorder occurs in the optical lines L1-2, L1-3 in which the optical channel service units 142, 143 are included (S519). At this time, in the case the measured distance is different from the distance information in the reference status information table over a reference value (for example, 30 m), the disorder verifying unit 250 may determine that a disorder such as disconnection and breaking occurs in the corresponding optical lines L2, L3. In addition, in the case where the measured optical signal intensity is different from the optical signal intensity information of the reference status information stable over a reference value (for example 2 dBm), the disorder verifying unit 250 may determine that an optical signal loss occurs due to blending in the corresponding optical lines L2, L3.

If so, the disorder notifying unit 260 recognizes that a disorder occurs in the optical lines L2, L3 in which the identified optical channel service units 142, 143 are included, and notifies the disorder generation information to the manager (S513).

Meanwhile, in Step S507, in the case the collected OTDR pulse pattern and the reference OTDR pulse pattern match up with each other over a threshold value (for example, 95%), the disorder verifying unit 250 performs Steps S515 and S517 in order to more accurately verify a disorder of the optical channel service units 142, 143 having identical or similar distance information. In other words, even though the collected OTDR pulse pattern and the reference OTDR pulse pattern match up with each other over a threshold value (for example, 95%), the disorder verifying unit 250 checks the identification information of a plurality of optical channel service units matched with the individual pulse to overlap each other from the reference OTDR pulse pattern having the matching information, and delivers a status request optical signal to each of the plurality of optical channel service units 142, 143 corresponding to the checked identification information.

Next, the disorder verifying unit 250 analyzes status response optical signals received from the plurality of optical channel service units 142, 143, and measures distances to the corresponding optical channel service units 142, 143 and intensity of the status response optical signal received from the optical channel service units 142, 143, respectively. In addition, the disorder verifying unit 250 compares the measured distance and optical signal intensity with the information of the reference status information table, and checks for each optical channel service unit 142, 143 whether the measured distance and optical signal intensity are different from the information of the reference status information table over a reference value (for example, 30 m in distance and −2 dBm in signal intensity). Subsequently, in the case either of the measured distance and optical signal intensity is different from the information of the reference status information table over a reference value, the disorder verifying unit 250 identifies that a disorder occurs in the optical lines L1-2, L1-3 in which the corresponding optical channel service units 142, 143 are included.

Meanwhile, in the case both the measured distance and optical signal intensity are not different from the information of the reference status information table over a reference value, the disorder verifying unit 250 determines that all optical lines are in normal operation.

As described above, the present disclosure shortens an optical line restoring time and improves work efficiency by exactly figuring out a path along which an abnormal pulse is introduced, recognizing the path as a disorder occurrence path and reporting the same to a manager. In addition, the present disclosure thoroughly verifies a disorder of each optical line by additionally inspecting a disorder for optical lines with identical or similar distances which have not been detected by the comparison of the OTDR pulse pattern.

This specification includes many features, but such features should not be interpreted as limiting the scope of the present disclosure or the claims. In addition, features described in individual embodiments in the specification may be combined and implemented as a single embodiment. On the contrary, various features described in a single embodiment may be implemented individually in various embodiments or suitably combined.

Various substances, changes and modifications can be made to the present disclosure described above by those having ordinary skill in the art within the scope of the present disclosure and the present disclosure is not limited to the above embodiments and the accompanying drawings.

The invention claimed is:

1. An optical line monitoring method for monitoring a disorder of an optical line by using an optical line monitoring system, the method comprising:
  (a) delivering status request optical signals to a plurality of optical channel service units and receiving a status response optical signal from each optical channel service unit;
  (b) measuring a distance of each optical channel service unit based on a round-trip delay time of the received status response optical signal and storing the distance of each optical channel service unit as a reference status information table to be mapped with identification information of the corresponding optical channel service unit;
  (c) delivering an OTDR (Optical Time Domain Reflectometer) pulse to each optical channel service unit which is in normal operation, receiving a plurality of individual OTDR pulses returned by reflection, and storing a reference OTDR pulse pattern exhibited by the plurality of individual OTDR pulses; and
  (d) checking a distance of each individual pulse in the reference OTDR pulse pattern, and matching each individual pulse with the identification information of each optical channel service unit so that a proximity order of the individual pulses is identical to a proximity order of the optical channel service units in the reference status information table.

2. The optical line monitoring method according to claim 1, wherein the step (d) includes:
   determining whether the number of individual pulses exhibited in the reference OTDR pulse pattern is identical to the number of optical channel service units recorded in the reference status information table;
   in the case the number of individual pulses exhibited in the reference OTDR pulse pattern is not identical to the number of optical channel service units recorded in the reference status information table as a result of the determination, checking identification information of a plurality of optical channel service units whose difference in distance is not greater than a threshold value; and
   matching the identification information of the plurality of checked optical channel service units to overlap at a single individual pulse.

3. The optical line monitoring method according to claim 2, after the step (d), further comprising:
   (e) when an inspection time of the optical line comes, delivering OTDR pulses to the plurality of optical channel service units, receiving a plurality of OTDR pulses returned by reflection, and obtaining an OTDR pulse pattern exhibited by the plurality of OTDR pulses;
   (f) comparing the individual pulses exhibited in the obtained OTDR pulse pattern with the individual pulses exhibited in the reference OTDR pulse pattern; and
   (g) in the case a mismatched individual pulse is present as a result of the comparison, checking the identification information of an optical channel service unit matched with the mismatched individual pulse in the reference OTDR pulse pattern to identify an optical line region where a disorder occurs.

4. The optical line monitoring method according to claim 3, wherein, in the step (b), an intensity of the status response optical signal received from each optical channel service unit is checked, and the intensity of each optical signal in the reference status information table is recorded to be mapped with the identification information of the corresponding optical channel service unit, and
   wherein the step (g) includes:
      in the case there is no mismatched individual pulse as a result of the comparison or an optical line where a disorder occurs is not recognizable even though the reference OTDR pulse pattern is compared with the obtained OTDR pulse pattern, checking the identification information of a plurality of optical channel service units matched to a single individual pulse, delivering a status request optical signal to each optical channel service unit corresponding to the identification information of the optical channel service units, and receiving a status response optical signal from each optical channel service unit;
      measuring an intensity of the status response optical signal and a distance to the optical channel service unit with regard to each of the plurality of optical channel service units by analyzing each received status response optical signal, and comparing the measured distance and optical signal intensity with the distance and optical signal intensity stored in the reference status information table; and
      in the case either of the measured distance and optical signal intensity is different from the distance and optical signal intensity stored in the reference status information table over a reference value, identifying an optical channel service unit which has delivered the corresponding optical signal, and determining that a disorder occurs in an optical line region where the optical channel service unit is included.

5. The optical line monitoring method according to claim 3, further comprising:
   checking identification information of the optical channel service unit included in the optical line region where a disorder occurs, generating disorder generation information recording the identification information of the optical channel service unit, and reporting the disorder generation information to a manager.

6. An optical line monitoring system, comprising:
   a database for storing a reference status information table where identification information of an optical channel service unit is mapped with a distance of the optical channel service unit and storing a reference OTDR (Optical Time Domain Reflectometer) pulse pattern where a plurality of individual pulses are exhibited; and
   a pulse matching unit for matching the identification information of each optical channel service unit with the individual pulses exhibited in the reference OTDR pulse pattern so that a proximity order of the individual pulses exhibited in the reference OTDR pulse pattern is identical to a proximity order of the optical channel service units in the reference status information table,
   wherein, in the case the number of individual pulses exhibited in the reference OTDR pulse pattern is determined to be not identical to the number of optical channel service units recorded in the reference status information table, the pulse matching unit checks identification information of a plurality of optical channel service units, whose difference in distance is not greater than a threshold value, in the reference status information table, and matches the identification information of the plurality of checked optical channel service units to overlap at a single individual pulse.

7. The optical line monitoring system according to claim 6, further comprising a disorder verifying unit for, in the case an inspection time of the optical line comes, delivering an OTDR pulse to each optical channel service unit, obtaining an OTDR pulse pattern exhibiting a plurality of individual OTDR pulses returned by reflection, checking a concordance rate of the obtained OTDR pulse pattern and the reference OTDR pulse pattern of the database, and verifying a disorder of the optical line based on the concordance rate.

8. The optical line monitoring system according to claim 7, wherein the disorder verifying unit checks a mismatched individual pulse by comparing the individual pulses exhibited in the obtained OTDR pulse pattern with the individual pulses exhibited in the reference OTDR pulse pattern, respectively, and identifying an optical line region where a disorder occurs by checking the identification information of an optical channel service unit matched with the individual pulse.

9. The optical line monitoring system according to claim 7,
   wherein, in the reference status information table, an intensity of an optical signal received from each optical channel service unit is recorded to be mapped with the identification information of the corresponding optical channel service unit, and
   wherein, in the case the concordance rate is not smaller than the threshold value or an optical line where a disorder occurs is not recognizable even though the reference OTDR pulse pattern is compared with the obtained OTDR pulse pattern, the disorder verifying unit checks the identification information of a plurality of optical channel service units matched at a single individual pulse, delivers a status request optical signal to each optical channel service unit corresponding to the identification information, receives a status response optical signal from the corresponding optical channel service unit, measures an intensity of the status response optical signal and a distance to the optical channel service unit with regard to each of the plurality of optical channel service units by analyzing each status response optical signal, in the case either of the measured distance and optical signal intensity is different from the distance and optical signal intensity stored in the reference status information table over a reference value, identifies an optical channel service unit which has delivered the different optical signal, and determines that a disorder occurs in an optical line region where the optical channel service unit is included.

10. The optical line monitoring system according to claim 7, further comprising a disorder notifying unit for checking identification information of the optical channel service unit included in the optical line region where a disorder occurs, generating disorder generation information recording the identification information of the optical channel service unit, and reporting the disorder generation information to a manager.

* * * * *